March 10, 1970      H. A. SMITH      3,500,194

METHOD AND MEANS FOR DETECTING UNAUTHORIZED USE OF ELECTRIC POWER

Filed June 21, 1965      2 Sheets-Sheet 1

INVENTOR:
HAROLD A. SMITH

BY Breitenfeld & Levine
ATTORNEYS

INVENTOR:
HAROLD A. SMITH
BY
ATTORNEYS

United States Patent Office 3,500,194
Patented Mar. 10, 1970

3,500,194
**METHOD AND MEANS FOR DETECTING UN-
AUTHORIZED USE OF ELECTRIC POWER**
Harold A. Smith, Plainfield, N.J., assignor to Devenco
Incorporated, New York, N.Y., a corporation of New
York
Filed June 21, 1965, Ser. No. 465,449
Int. Cl. G01r *1/00, 31/02*
U.S. Cl. 324—110    6 Claims

ABSTRACT OF THE DISCLOSURE

Power line monitoring system includes switch means in series with each authorized load for instantaneously disconnecting and then reconnecting all the loads, simultaneously, and at regular intervals. Current flowing in power line measured during period of load disconnection. Switch may be a silicon controlled rectifier activated via a Zener diode.

---

This invention relates to a method and system for continuously monitoring an electric power line in order to detect the presence of any load connected to the power line without the authorization of the owner of the line.

It is an object of the invention to provide such a system and method capable of performing the intended function without interfering with the operation of authorized loads connected to the power line.

In general, the invention contemplates disconnecting all the authorized loads from the power line for a fraction of a second, and during this period making a very sensitive measurement to determine whether or not any current is flowing in the power line. If no unauthorized load is connected to the line, no current will be detected since all current-drawing devices have been disconnected from the line. However, should an unauthorized load be connected to the line, it will continue to draw current during the period that all authorized loads are disconnected, and this current will be detected, indicating that a load unknown to the owner of the line is connected to it. A suitable indicating means capable of rendering some sensible indication is connected to the means for detecting the current.

Disconnection of all authorized loads and measurement of current flow in the power line is repeated at predetermined intervals in order to yield a continuous monitoring of the power line. It should be mentioned that disconnection of the authorized loads, e.g., lights, motors, etc., for the short period contemplated by this invention has no noticeable effect on the operation of these loads. However, the period of disconnection is sufficient to permit a practical current measurement.

According to the invention, a switching means is placed in series with each authorized load for instantaneously disconnecting its respective load from the power line at a predetermined time, and a brief period later reconnecting the load to the power line. In the preferred embodiment of this invention, the switching means includes a silicon controlled rectifier. Due to certain inherent characteristics of this solid-state, semi-conductor device, it is possible to achieve several additional objects of this invention, namely:

(a) To provide a system in which the authorized loads can be disconnected and reconnected to the power line in instantaneous response to commands;

(b) To provide a system in which the switching means for controlling the connection and disconnection of the authorized loads can be arranged in compact packages which are practical from an installation point of view; and (c) To provide a system in which the switching means can handle large currents with very small power dissipation.

The invention also provides a control device to activate the switching means. In the preferred embodiment, the control device is a Zener diode so arranged with respect to the silicon controlled rectifier that it causes the latter to perform its switching function once during each cycle of the alternating current power supply. Since the Zener diode is also a solid-state, semi-conductor device, it is admirably suited to the task of achieving the objects of the invention mentioned above.

Additional objects and features of the invention will be apparent from the following detailed description in which reference is made to the accompanying drawings.

For the purpose of aiding in understanding the present invention, assume that a system according to the invention is to be installed in a building which is supplied with alternating current power by a public utility, the power being directed to a watt-hour meter 10 (FIG. 2) immediately upon entering the building. From the meter 10, the power flows to a fuse box 11 from which it is distributed throughout the building through one or more pairs of power lines or circuits. For the sake of convenience, only one circuit or pair of power lines 12 is illustrated. This circuit is shown supplying electric power to an illuminating device 13 and a fan 14. These devices are, of course, intended to be illustrative of any loads which the owner of the power lines may wish to connect to the lines.

Figure 1:
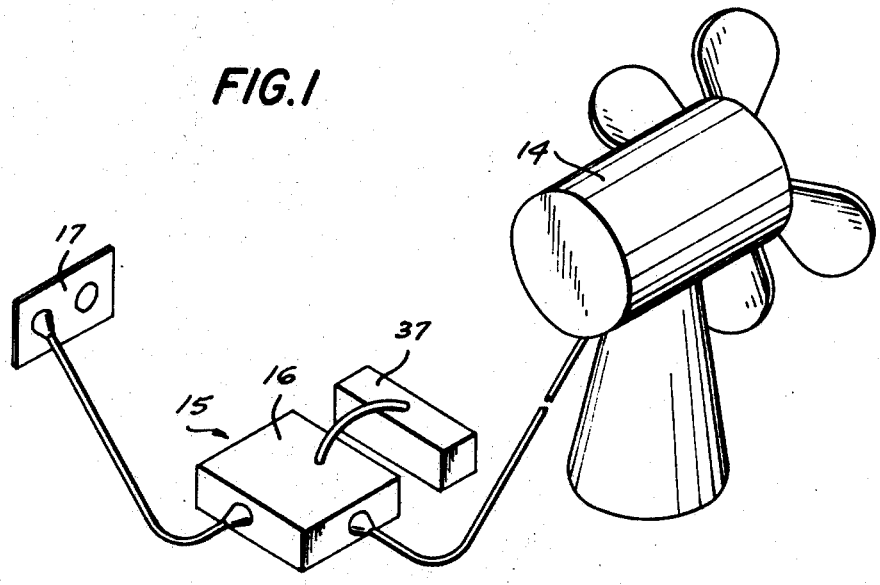
FIG. 1 illustrates the manner in which a disconnection device can be associated with a typical load.

In the embodiment chosen to illustrate the present invention, a disconnection device 15 is connected in series with each of the loads 13 and 14. The manner in which this may be accomplished is illustrated in FIG. 1. A disconnection device 15, which may be housed in a compact enclosure 16, is supplied with power by means of a conventional cord plugged into an electric outlet 17 in the wall. A load, such as the fan 14, is in turn plugged into an outlet provided in the enclosure 16.

A disconnection device according to the present invention advantageously comprises solid-state, semi-conductor components. In the present example, a silicon controlled rectifier (SCR) 20, which serves as a switching means, is connected with its current path in series with the load, in this case the light bulb 13. Connected in parallel with the SCR 20 are a Zener dinde 21, a diode 19, and a resistor 22 arranged in series. The gate 23 of SCR 20 is connected to a terminal 24 between the Zener diode and the resistor, and the Zener diode is arranged to pass current rearwardly in the direction of the gate 23. The elements just described control the flow of current to the load 13 from the power lines 12 during one half of each cycle, say the positive half-cycle, of the power source.

Flow of current may be controlled during the other half of each cycle, say the negative half-cycle, by an identical set of elements symmetrically arranged with respect to the set described above. This set includes an SCR 25 in parallel with the SCR 20, the two SCR's being arranged to pass current in opposite directions. Connected in parallel with SCR 25 are a Zener diode 26, a diode 30 and a resistor 27 arranged in series. The gate 28 of SCR 25 is connected to a terminal 29, and the Zener diode 26 is arranged to pass current rearwardly in the direction of the gate 28.

At the beginning of any cycle of the power source, (time $t_0$ in FIG. 3) the voltage applied to the load is, of course, zero. If the load has neither a leading nor a lagging power factor, such as is the case with the light bulb 13 which is substantially a pure resistance, the current flowing through the load will also be zero at this time. During the positive half-cycle of the power source, the polarity of the SCR 20 will be such that it is in condition to fire, i.e. pass current, and if a sufficent potential is applied to its gate 23 during this half-cycle it will fire. The SCR 25, during the positive half-cycle, has a reverse polarity and hence is incapable of firing. Furthermore, the diode 30 prevents current flow through either the gate 28 or resistor 27 to Zener diode 26. The diode 19 serves an analogous function during the negative half-cycle. As the voltage begins to rise during the initial portion of the positive half-cycle, no potential is applied to the gate 23 of the SCR 20 because the Zener diode 21 does not conduct current. Hence, the SCR remains non-conductive and no current flows to the load 13. As the voltage continues to rise during the positive half-cycle, the Zener voltage is reached, at time $t_1$ in FIG. 3, whereupon the Zener diode 21 breaks down and conducts a current to the resistor 22. A voltage drop is thereby produced across the resistor 22 which exceeds the firing potential of the SCR. Hence, the SCR 20 becomes conductive instantly, and remains in this condition throughout the remainder of the positive half-cycle. Consequently, current flows through load 13 during the remainder of the positive half-cycle. Since the resistance of a conducting silicon controlled rectifier is extremely low, no further current flows through the Zener diode or resistor 22, and the load 13 is unaffected by the presence of the SCR 20 in series with it.

At the end of the positive half-cycle (time $t_2$ in FIG. 3), the line voltage once again becomes zero, and the SCR 20 stops conducting, thus blocking further current flow to the load. During the negative half-cycle of the power source, the SCR 25 will be conditioned to fire, but the SCR 20 will be incapable of passing current. As the voltage begins to rise during the negative half-cycle, no potential is applied to the gate 28 of SCR 25 because the Zener diode 26 does not conduct current. Hence, the SCR 25 remains non-conductive and no current flows to the load 13. As the voltage continues to rise during the negative half-cycle, the Zener voltage is reached, at time $t_3$ in FIG. 3, whereupon the Zener diode 26 breaks down and conducts a current to resistor 27. A voltage drop is thereby produced across the resistor 27 which exceeds the firing potential of SCR 25. Hence, the SCR becomes conductive instantly, and remains in this condition throughout the remainder of the negative half-cycle. Consequently, current flows through the load 13 during the remainder of the negative half-cycle.

Figure 3:
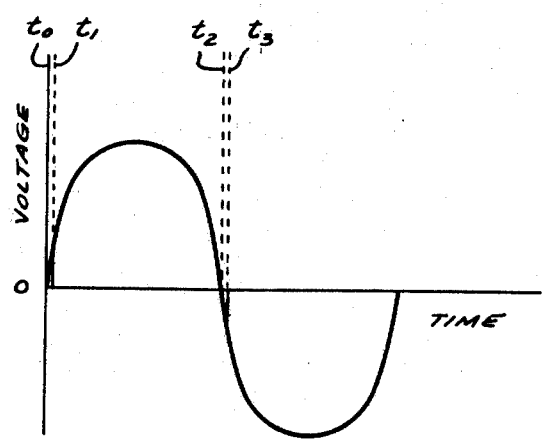
FIG. 3 is a diagram of the voltage waveform of the power source.

For the purpose of facilitating an understanding of the present invention, assume that the Zener diodes 21 and 26 break down when a potential difference of 20 volts is applied to them, i.e., their Zener voltage is 20 volts. They would then break down at arc tan 20/115 × 1.414 (assuming the line voltage is 115 volts) or 7° after the voltage waveform of the power source passes through zero. If the waveform of the power source varies at the rate of 60 cycles per second, 7° corresponds to an elapsed time of about 300 microseconds. Thus, in the present example, the period during which the load would be disconnected from the power lines during each half-cycle of the power source is 300 microseconds. These periods of disconnection are illustrated in FIG. 3 as extending from time $t_0$ to time $t_1$, and from time $t_2$ to time $t_3$. Disconnection of an electrical device from the power source for such a short period of time produces no noticeable effect on the operation of the device.

Figure 2:
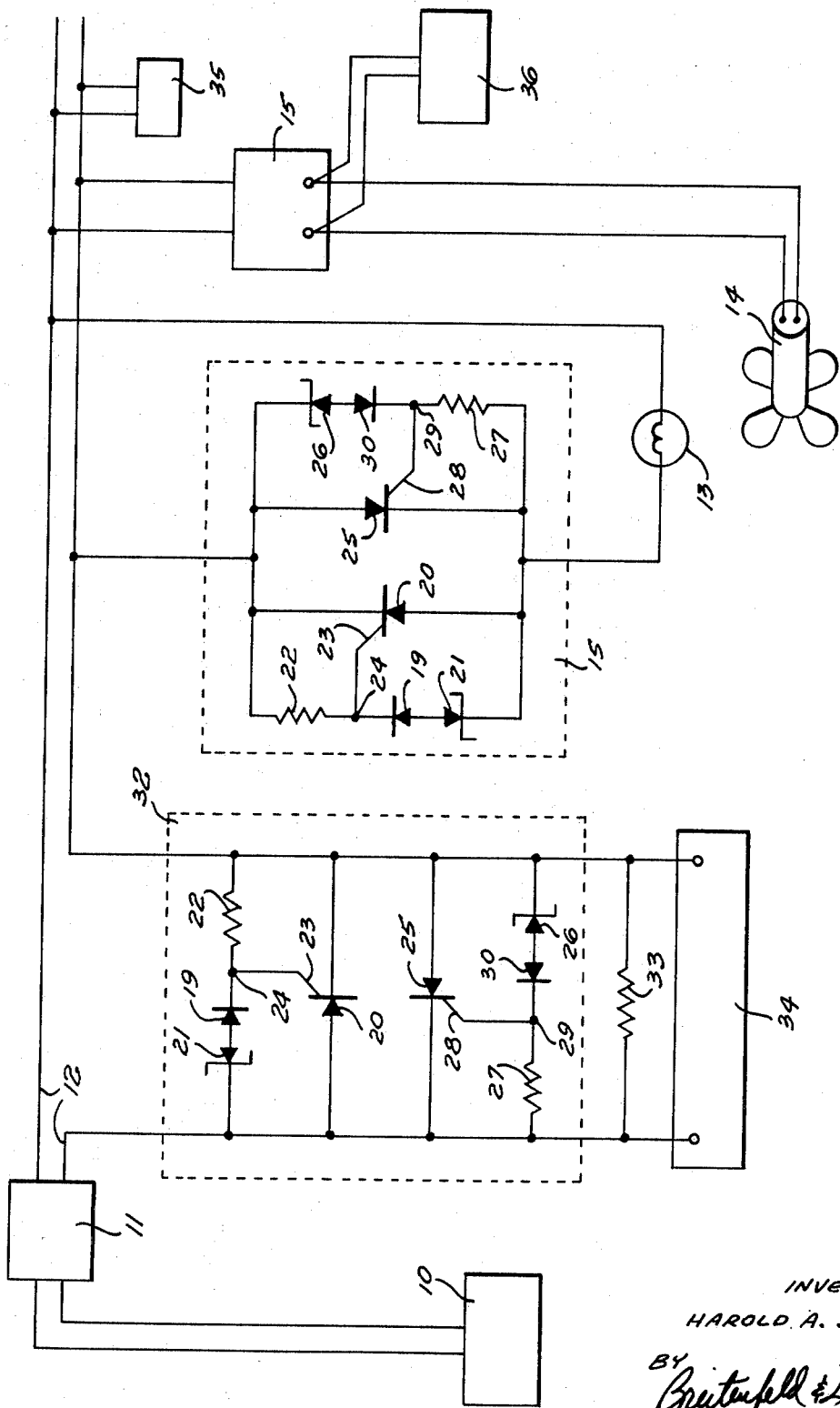
FIG. 2 is a schematic diagram of an illustrative embodiment of the present invention.

An allustrative means for detecting current flow in the power lines 12 during the periods in which all the loads are disconnected is illustrated in FIG. 2. Connected in series with the power lines is a disconnection device 32 identical to the disconnection device 15. For this reason, the same reference numerals have been applied to the components of disconnection device 32 as were applied to the components of disconnection device 15. Consequently, during the intervals in which the authorized loads 13 and 14 are disconnected from the power lines by means of devices 15, the power line 12 will be opened by means of disconnection device 32, and similarly, when all the loads are reconnected to the power lines, the power line 12 will be reclosed. Connected in parallel with the disconnection device 32 is a relatively large resistor 33, and connected across the resistor 33 is a suitable indicating device, or alarm 34, of conventional design.

During any period in which the disconnection devices 15 and 32 are open, no current will flow through the resistor 33, since all the loads are disconnected from the power line, and the indicating device remains inactive. During other times, of course, substantially all the current flows through the very low resistance paths offered by the SCRs 20 and 25 of device 32, and hence no current flows through resistance 33. However, assume that an unauthorized device 35 (FIG. 2) has been connected to the power lines 12. This load 35 will not be provided with a disconnection device 15, as are all the authorized loads, and so will be connected directly to the power lines. Now, during a period in which all the authorized loads are disconnected from the power line, and the power line is open, current will flow from the fuse box 11, through resistor 33, and through the load 35. The indicating device 34 will respond to the voltage drop produced across resistor 33 by rendering some sensible indication. For example, the device 34 could be a galvanometer which visually indicates the existence of a voltage drop across resistor 33, or which closes a switch to energize a light or a bell. Such a device can be made to respond to the flow of a few milliamperes through the resistor, and hence an authorized device which draws even the minimum usable power of one watt can easily be detected.

As described above, the device 15 disconnects the load to which it is attached twice during each cycle of the power source, i.e., 120 times per second. If desired, the device can be arranged to disconnect its respective load only once during each cycle, i.e., 60 times per second. This can be accomplished by eliminating the SCR 25, Zener diode 26 and resistor 27, and replacing them with a diode arranged to pass current in the same direction as the SCR 25 passes current. Such a diode will, of course, pass no current during positive half-cycles of the power source, but will conduct throughout the entire negative half-cycle.

Furthermore, it will be apparent that in the present example, the Zener diode in connection with the voltage waveform applied to it, serves as a timing device for determining the period during which its respective SCR does not conduct. This period begins at time $t_0$ when the line current is zero and ends at time $t_1$ when the line voltage reaches the Zener voltage. Thus, in the system described, the loads are disconnected from the power line at regular intervals determined by the voltage waveform of the source. It is contemplated that timing means other than Zener diodes may be employed to fire the SCRs at regular or irregular intervals not dependent upon the voltage waveform of the power source.

Another point which should be mentioned is the desirability of correcting the power factor of loads having a leading or lagging power factor, such as the fan 14. Any conventional correction device 36 may be associated with the load in order to make its power factor substantially unity. In FIG. 1, the means for correcting the power factor of the fan 14 is shown housed within an auxiliary enclosure 37 electrically connected to the disconnecting device 15. Correcting the power factor to unity, of course, brings the current waveform in each load into phase with the voltage waveform of the power source. This is advantageous since in the present example, loads are disconnected from the power line during the initial period of each half-cycle of the line voltage, and hence if the current is in phase with the voltage, only low value currents will be denied to the loads during their periods of disconnection. However, even if the load currents are out of phase with the line voltage and the loads are disconnected from the power line at an instant when current of substantial value is being supplied to them, the loads will not be adversely affected since, according to this invention, the loads are disconnected from the power line for a very short period of time.

In order to minimize the degree of power factor correction required, it is advantageous to provide the indicating device 34 with a sampling gate which monitors the power line during only a portion of the time ($t_0$–$t_1$ or $t_2$–$t_3$) that the authorized loads are disconnected. Consequently, the power factor of the loads need not be corrected to the extent required to cause all the loads to be disconnected from, and reconnected to, the power line at exactly the same instant. It is only necessary to correct the power factor of each load sufficiently to insure that it is disconnected during the period the power line is being monitored by the indicating device 34. If desired, instead of providing the indicating device with a sampling gate, the voltage rating of the Zener diodes 21 and 26 of the disconnection device 32 can be made smaller than the rating of the corresponding Zener diodes of the disconnection devices 15, e.g. the Zener diodes of device 32 may have a one volt breakdown level whereas the Zener diodes of devices 15 break down at 20 volts. As a result, the disconnection device 32 will obviously open the power line for a much shorter period than the disconnection devices 15 will disconnect their respective loads from the power lines.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A system for continuously monitoring an alternating current electric power line, having one or more authorized loads connected to it, for the purpose of detecting the connection of an unauthorized load to the power line, comprising:
    (a) means in series with each authorized load for automatically disconnecting all the authorized loads from and after a time period reconnecting all the authorized loads to the power line, said period being a fraction of a second so that said disconnection has no noticeable effect on said authorized loads, said disconnecting and reconnecting occurring at predetermined intervals,
    (b) means in series with the power line capable of detecting current flow in the power line during said time periods, and
    (c) means responsive to said detecting means for rendering a sensible indication whenever said detecting means senses current flow in the power line during said time periods
        whereby if an unauthorized load is connected to the power line current will flow in the power line during said time periods and a sensible indication will be rendered.

2. A method for continuously monitoring an alternating current electric power line, having one or more authorized loads connected to it, for the purpose of detecting the connection of an unauthorized load to the power line, comprising the steps of:
    (a) disconnecting all the authorized loads from the power line during the same brief time period, said period being a fraction of a second so that said disconnection has no noticeable effect on said authorized loads,
    (b) repeating step (a) at predetermined intervals, and
    (c) monitoring the power line to detect the presence of a current in the power line during said time periods,
        detection of such a current indicating the connection of an unauthorized load to the power line.

3. A system for continuously monitoring an alternating current electric power line, having one or more authorized loads connected to it, for the purpose of detecting the connection of an unauthorized load to the power line, comprising:
    (a) switch means in series with the power line,
    (b) means for actuating said switch means in series with the power line to open the power line and a brief time period later to close the power line, said period being a fraction of a second so that said disconnection has no noticeable effect on said authorized loads,
    (c) switch means in series with each authorized load,
    (d) means for actuating said switch means in series with each authorized load in order to disconnect each authorized load from the power line no later than the time the power line opens and to reconnect each authorized load to the power line no earlier than the time the power line closes, whereby each authorized load is disconnected from the power line during said brief time period, but said authorized loads nevertheless being disconnected only for a period equal to a fraction of a second, and
    (e) means in series with the power line and in parallel with said switch means in series with the power line for detecting the flow of current in the power line during said brief time period.

4. A system as defined in claim 3 wherein said switch means in series with the power line and said switch means in series with each authorized load are silicon controlled rectifiers.

5. A system as defined in claim 4 wherein said means for actuating said switch means in series with the power line and said means for actuating said switch means series with each authorized load include Zener diodes arranged in a circuit connected in parallel with said silicon controlled rectifiers.

6. A system as defined in claim 3 including means associated with each authorized load having a leading or lagging power factor for correcting the power factor.

References Cited

UNITED STATES PATENTS 3,105,230   9/1963   MacIntyre _____ 330—9 XR
3,295,020   12/1966  Borkovitz _____ 317—33

RUDOLPH V. ROLINEC, Primary Examiner

ERNEST F. KARLSEN, Assistant Examiner

U.S. Cl. X.R.
324—51; 340—253